(12) United States Patent
Honjo et al.

(10) Patent No.: US 9,736,352 B2
(45) Date of Patent: Aug. 15, 2017

(54) IMAGING APPARATUS AND CAMERA BODY

(71) Applicant: Panasonic Intellectual Property Management Co., Ltd., Osaka (JP)

(72) Inventors: Kenichi Honjo, Osaka (JP); Junji Takahata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 119 days.

(21) Appl. No.: 14/811,108

(22) Filed: Jul. 28, 2015

(65) Prior Publication Data

US 2016/0037053 A1    Feb. 4, 2016

(30) Foreign Application Priority Data

Aug. 4, 2014 (JP) .................................. 2014-158318
May 28, 2015 (JP) .................................. 2015-108773

(51) Int. Cl.
 *H04N 5/232* (2006.01)

(52) U.S. Cl.
 CPC ..... *H04N 5/23212* (2013.01); *H04N 5/23248* (2013.01); *H04N 5/23258* (2013.01); *H04N 5/23264* (2013.01)

(58) Field of Classification Search
 CPC ........... H04N 5/23212; H04N 5/23248; H04N 5/23258; H04N 5/23264
 See application file for complete search history.

(56) References Cited

U.S. PATENT DOCUMENTS

| 2007/0122129 A1* | 5/2007 | Sakamoto ......... H04N 5/23212 396/52 |
| 2010/0026821 A1* | 2/2010 | Sato ....................... G03B 5/00 348/208.99 |
| 2013/0010137 A1 | 1/2013 | Kawai |

FOREIGN PATENT DOCUMENTS

| JP | 8-334677 | 12/1996 |
| JP | 2007-293144 | 11/2007 |
| JP | 2011-081186 | 4/2011 |
| JP | 2013-021407 | 1/2013 |

* cited by examiner

*Primary Examiner* — Daniel M Pasiewicz
(74) *Attorney, Agent, or Firm* — Wenderoth, Lind & Ponack, L.L.P.

(57) ABSTRACT

An imaging apparatus of the present disclosure includes a body, an imaging unit provided in the body, the imaging unit for capturing an image of an object and generating an image, a focus lens movable in an optical axis direction, the focus lens for adjusting a focus state of the image, an evaluation value detector for detecting a focus evaluation value of the image, a movement detector for detecting a moving direction and an amount of movement of the body in the optical axis direction, and a controller for controlling movement of the focus lens. The controller determines a direction to which the focus lens is to be moved, based on the moving direction of the body in the optical axis direction detected by the movement detector and the focus evaluation value detected by the evaluation value detector.

5 Claims, 8 Drawing Sheets

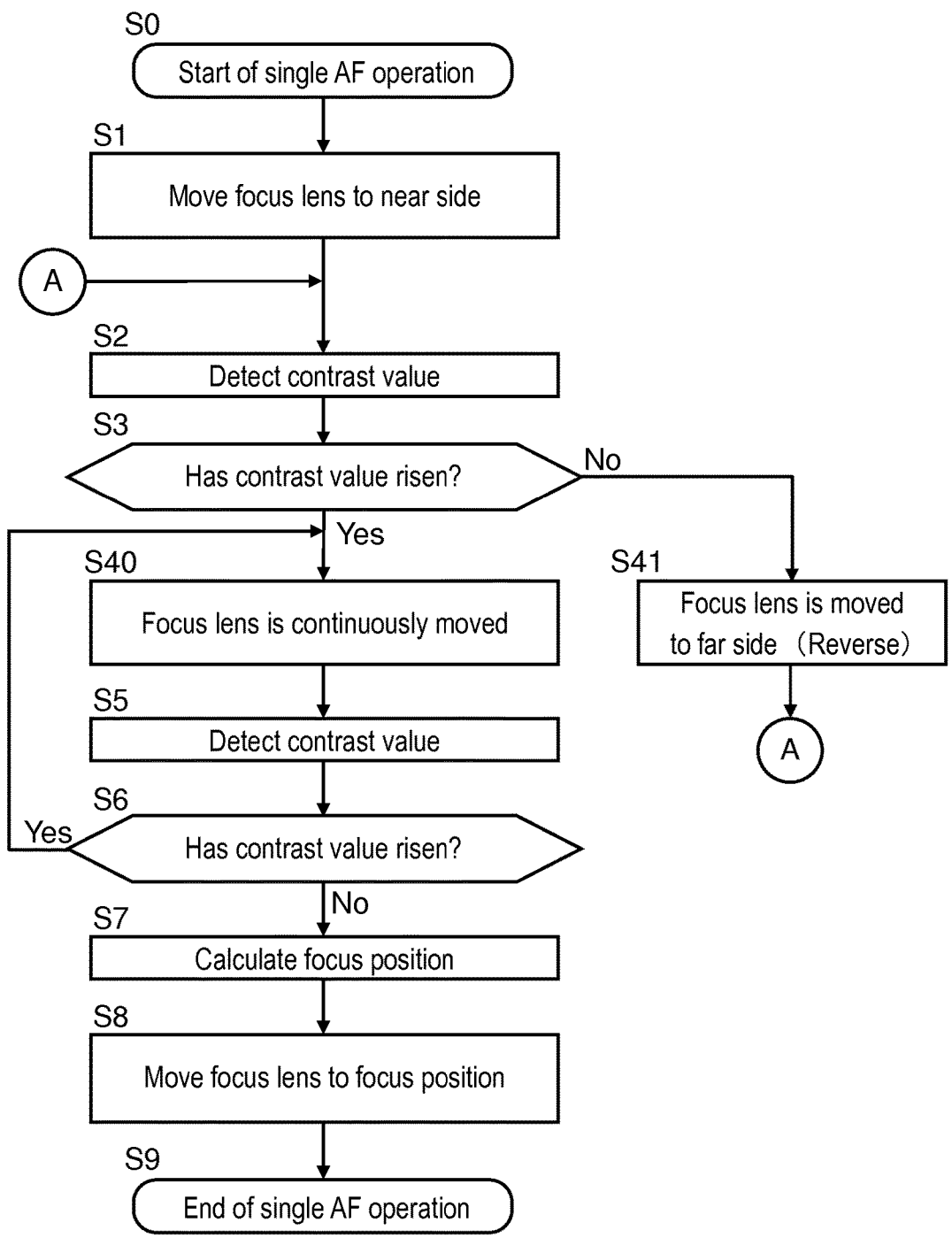

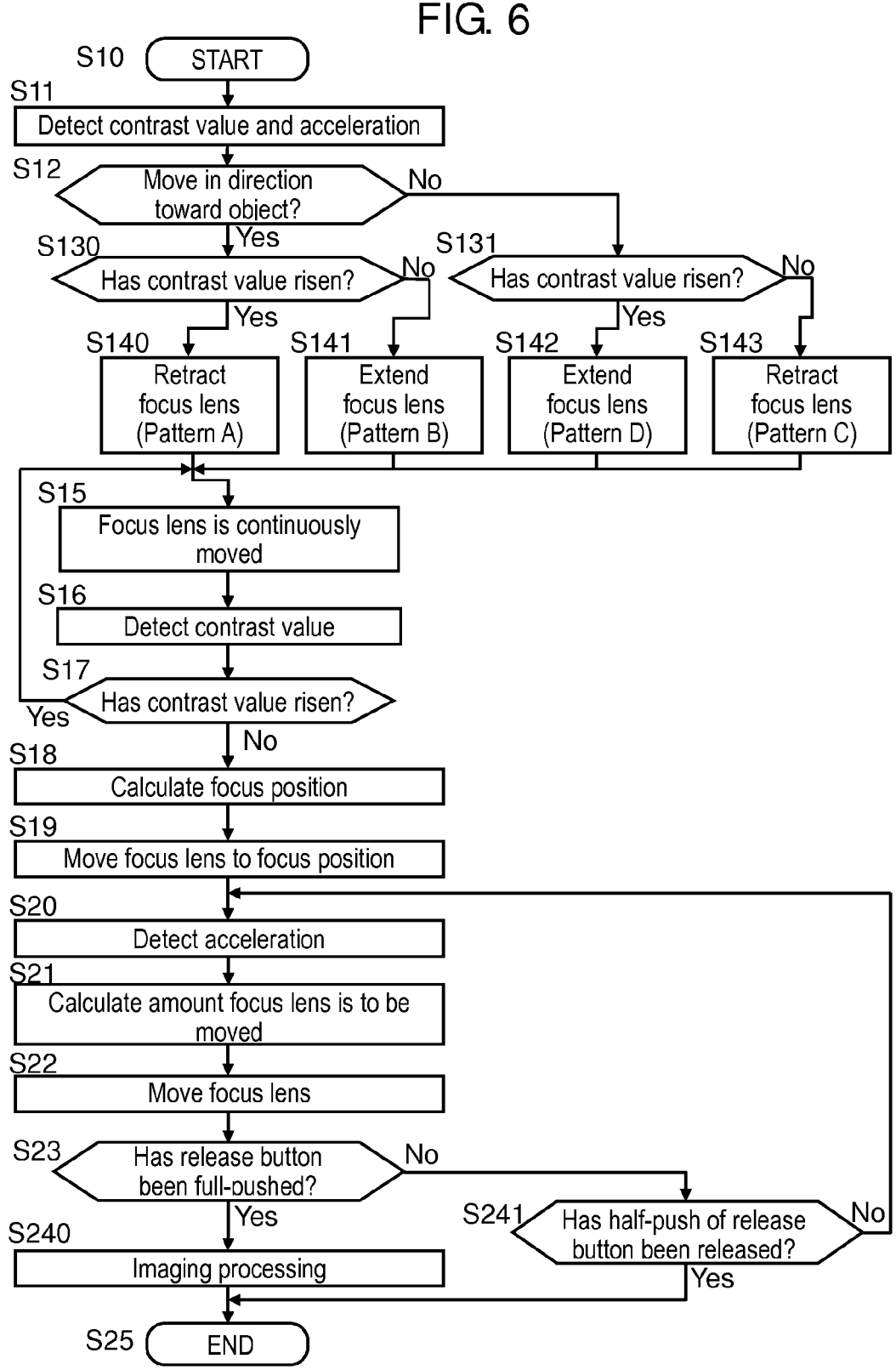

IMAGING APPARATUS AND CAMERA BODY

BACKGROUND

1. Technical Field

The present disclosure relates to an imaging apparatus equipped with an auto focus function.

2. Description of the Related Art

PTL 1 discloses correction of camera shake in an optical axis direction by detecting a displacement of a digital camera due to camera shake caused by a user, with the use of an acceleration sensor mounted in the digital camera, and moving a focus lens according to the displacement of the digital camera, and thereby correcting a focus displacement that occurs when the digital camera moves toward or away from an object.

CITATION LIST

Patent Literature

PTL 1: Unexamined Japanese Patent Publication No. 2007-293144

SUMMARY

The present disclosure aims at providing an imaging apparatus capable of operating auto focus (hereinafter referred to as AF) to speedily come into a focus state even when a user causes a displacement of a camera in an optical axis direction with respect to a desired object.

An imaging apparatus of the present disclosure includes a body, an imaging unit provided in the body, the imaging unit for capturing an image of an object and generating an image, a focus lens movable in an optical axis direction, the focus lens for adjusting a focus state of the image, an evaluation value detector for detecting a focus evaluation value of the image, a movement detector for detecting a moving direction and an amount of movement of the body in the optical axis direction, and a controller for controlling movement of the focus lens. The controller determines a moving direction to which the focus lens is to be moved, based on the moving direction of the body in the optical axis direction detected by the movement detector and the focus evaluation value detected by the evaluation value detector.

The present disclosure can provide an imaging apparatus capable of operating AF to come into a focus state in a short amount of time even when a user causes a displacement of a camera in an optical axis direction with respect to a desired object.

BRIEF DESCRIPTION OF DRAWINGS

FIG. 4 is a flowchart of the operation of the conventional single AF;

FIG. 6 is a flowchart of the operation of optical axis direction shake correction according to the first exemplary embodiment;

DETAILED DESCRIPTION OF THE PREFERRED EMBODIMENTS

First Exemplary Embodiment

An imaging apparatus according to a first exemplary embodiment allows a camera to focus at a high speed and ensure focus accuracy even in a state where the camera moves forward or backward in an optical axis direction due to camera shake caused by a user, causing an object to become closer to or away from the camera. First, description will be made of a case where the imaging apparatus in the first exemplary embodiment is applied to digital camera 100.

1-1. Configuration

An electrical configuration and a back configuration of digital camera 100 according to the first exemplary embodiment will be described with reference to FIGS. 1 and 2.

[1-1-1. Electrical Configuration of Digital Camera]

Figure 1:
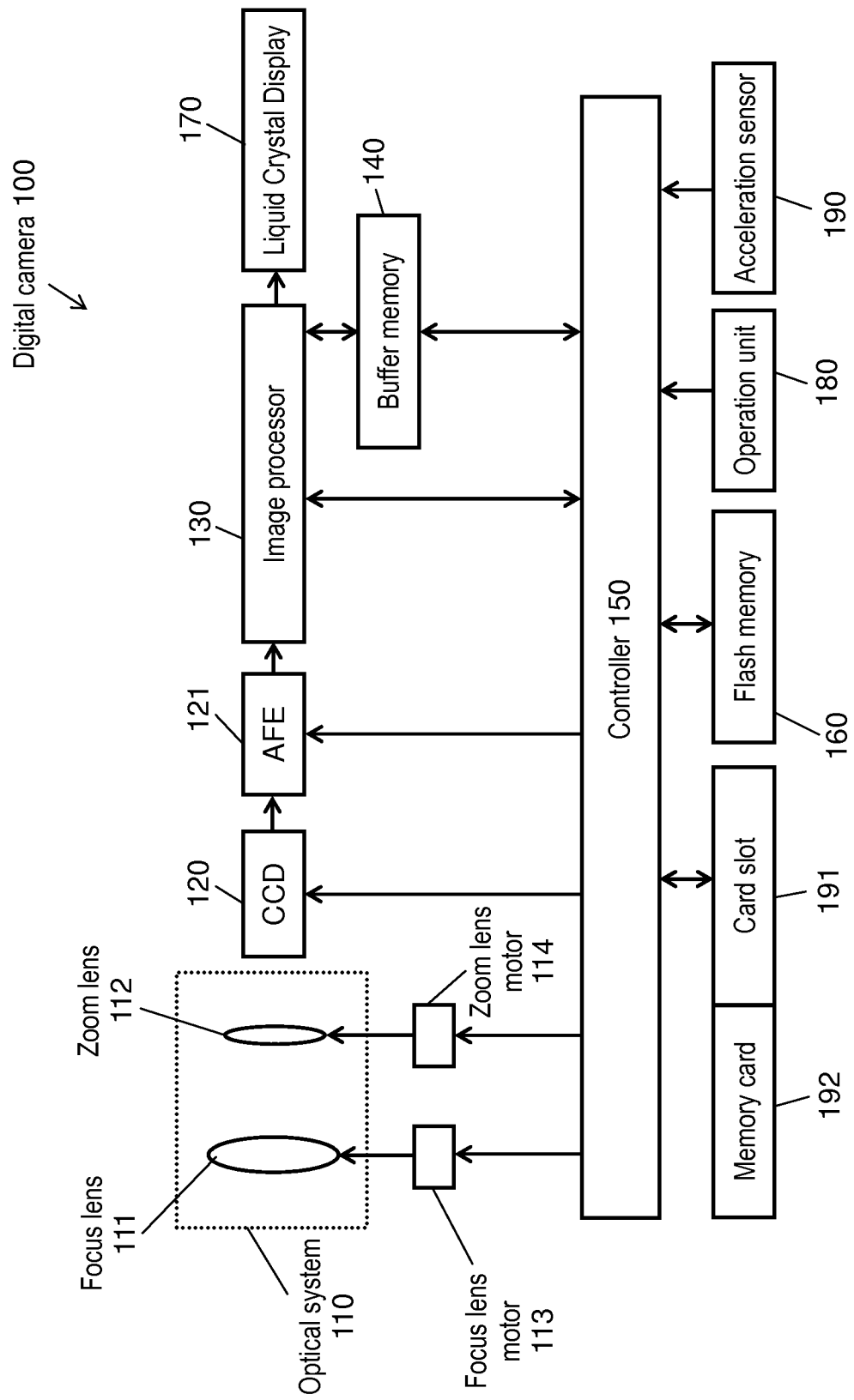
FIG. 1 is an electrical configuration diagram of a digital camera according to a first exemplary embodiment.
Figure 2:
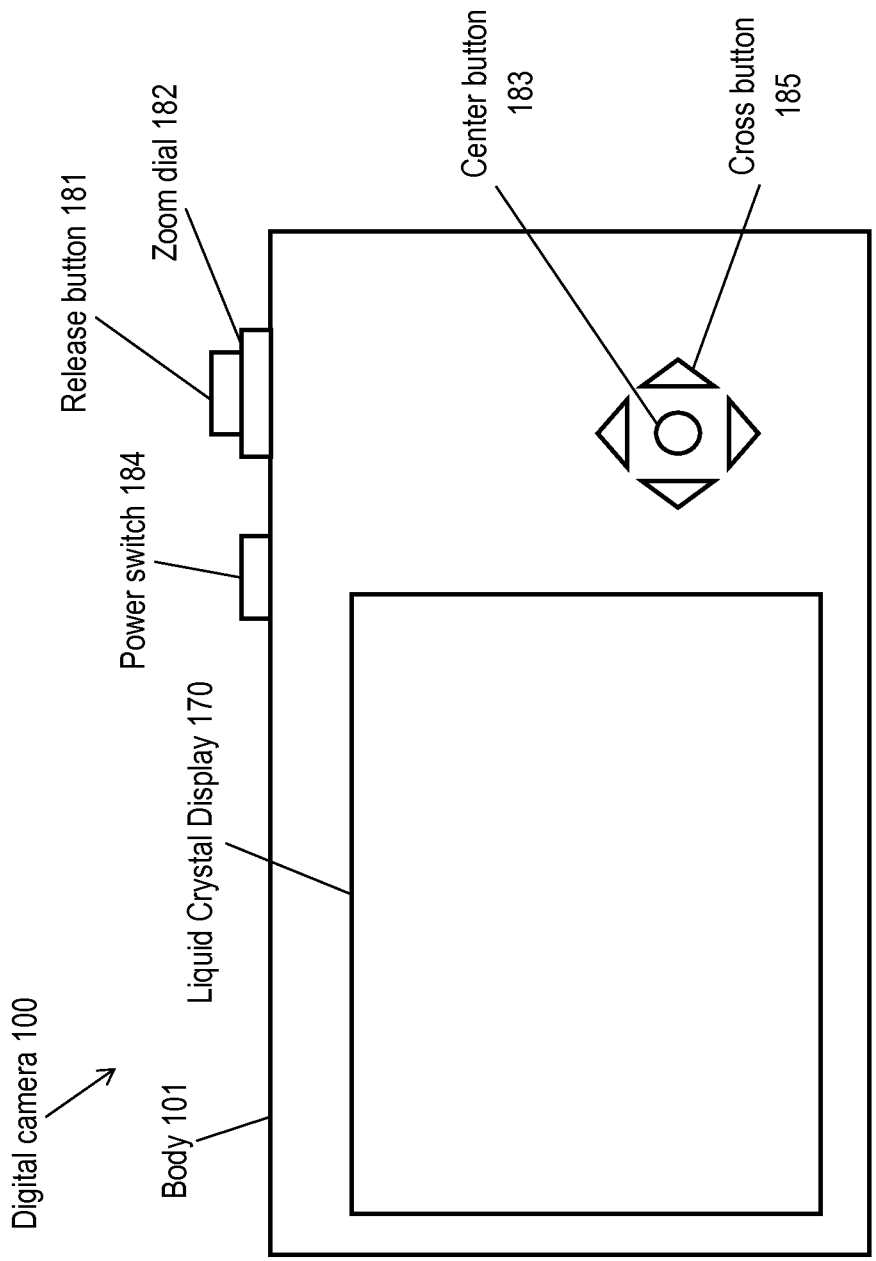
FIG. 2 is a back view of the digital camera according to the first exemplary embodiment.

FIG. 1 shows an electrical configuration of digital camera 100.

Digital camera 100 captures an object image formed through optical system 110 with CCD (Charge-Coupled Device) image sensor 120. CCD image sensor 120 generates image data based on the captured object image. The image data generated by image capturing is subjected to various kinds of processing in AFE (Analog Front End: preprocessing unit) 121 and image processor 130. The image data is stored in flash memory 160 or memory card 192. The stored image data is reproduced and displayed on LCD (Liquid Crystal Display) 170 upon reception of an operation of operation unit 180 by a user.

Controller 150 performs centralized control of an operation of entire digital camera 100. Controller 150 includes a ROM (Read Only Memory) for storing information such as programs, a CPU (Central Processing Unit) for processing information such as programs, and so on. The ROM stores programs for single AF and AF control such as optical axis direction shake correction, as well as a program for centralized control of the operation of entire digital camera 100. In the first exemplary embodiment, an operation for optical axis direction shake correction will be described in detail below. The ROM is not necessarily an internal component of controller 150, and may be provided outside controller 150. Controller 150 may be configured with a hardwired electronic circuit or may be configured with a microcomputer and the like.

Optical system 110 includes focus lens 111 and zoom lens 112, or the like. Optical system 110 may include an optical shake correction lens OIS (Optical Image Stabilizer) not shown. Each type of lens constituting optical system 110 may include any number of lenses or may include any number of groups.

Focus lens 111 is used for adjustment of focal length. Focus lens motor 113 drives focus lens 111 in an optical axis direction according to a control signal communicated from controller 150. Control signals to drive focus lens 111 include a control signal for compensating for a change in a focus state of an object image accompanying movement of zoom lens 112, and a control signal for optical axis direction shake correction to be described below. Upon receiving from controller 150 a control signal such that a position of focus lens 111 is fixed, focus lens motor 113 fixes focus lens 111 in the position.

Zoom lens 112 is used for adjustment of a magnification and reduction factor. Zoom lens motor 114 drives zoom lens 112 in an optical axis direction according to a control signal communicated from controller 150. A control signal to drive zoom lens 112 is generated by controller 150 in response to a user's operation of operation unit 180. Zoom lens motor 114 is not an indispensable component. Zoom lens 112 may be configured to move in an optical axis direction in response to a user's manual operation.

CCD image sensor 120 converts light concentrated through optical system 110 into an electrical signal. A plurality of photodiodes is two-dimensionally arrayed on a light-receiving surface of CCD image sensor 120. Light from an object passes through optical system 110, and then is imaged on the light-receiving surface of CCD image sensor 120. The light-receiving surface converts light from an object into charges by photoelectric effect for storage. Charges stored in respective light-receiving surfaces are transferred to an amplifier (not shown) by a vertical CCD and a horizontal CCD to generate an image signal. CCD image sensor 120 generates image data in a new frame at regular time intervals. In place of CCD image sensor 120, a different imaging element such as a CMOS image sensor or an NMOS image sensor may be used.

AFE 121 executes processing such as correlated double sampling, gain adjustment, and others on an image signal generated by CCD image sensor 120. AFE 121 also performs conversion from analog-format image data into digital-format image data. Thereafter, AFE 121 outputs the image data to image processor 130.

Image processor 130 performs various kinds of processing on the image data. The various kinds of processing include gamma correction, white balance correction, YC conversion processing, electronic zoom processing, compression processing, expansion processing, and so on, but are not limited to them. Image processor 130 may be configured to lack part of them. Image processor 130 may be configured with a hardwired electronic circuit or may be configured with a microcomputer and the like using a program. Alternatively, image processor 130 may be configured with a single semiconductor chip together with controller 150 and others.

Buffer memory 140 is a storage unit functioning as a work memory of image processor 130 and controller 150. Buffer memory 140 can be implemented by DRAM (Dynamic Random Access Memory) or the like.

Flash memory 160 functions as an internal memory for storing image data and so on. Controller 150 stores image data processed by image processor 130 in flash memory 160 or memory card 192.

Card slot 191 is a connection portion into which memory card 192 is removably inserted. To card slot 191, memory card 192 can be electrically and mechanically connected. Card slot 191 may have a function of controlling memory card 192.

Memory card 192 is an external memory having a storage such as flash memory inside. Memory card 192 can store data such as image data processed by image processor 130. In the first exemplary embodiment, memory card 192 is shown as an example of an external memory, but the present disclosure is not limited to the first exemplary embodiment. For example, a storage medium such as an optical disk may be used as an external memory.

LCD 170 displays an image based on image data processed by image processor 130. Images displayed on LCD 170 include through images and stored images. Through images are images in new frames generated at regular time intervals by CCD image sensor 120 and displayed sequentially. By referring to through images displayed on LCD 170, a user can shoot while checking a composition of an object. Stored images are images stored in memory card 192 or flash memory 160. LCD 170 displays an image based on image data that has been stored, in response to a user's operation. LCD 170 can display setting conditions of digital camera 100 or the like as well as an image. Not limited to a liquid crystal system, a plasma system, and an organic EL system, any display that displays image data may be applied to the first exemplary embodiment.

Operation unit 180 may be a button-shaped one or a slide-shaped one provided to an exterior of digital camera 100, or one in a touch-panel type operated by touching LCD 170. Digital camera 100 executes various operations upon receiving an operation of operation unit 180 by a user.

Acceleration sensor 190 is used for detecting acceleration of digital camera 100 in an optical axis direction. An output signal (i.e. acceleration information) of acceleration sensor 190 is transmitted to controller 150. Controller 150 once integrates or twice integrates acceleration information for conversion into velocity information or position information. By controlling movement of focus lens 111 as described below based on the converted velocity information or position information, shake correction in an optical axis direction is performed. Controller 150 may transmit information to perform various settings to acceleration sensor 190.

[1-1-2. Back and Top Configuration of Digital Camera]

A back and top configuration of digital camera 100 will be described. FIG. 2 is a back view of digital camera 100.

On a back and a top of body 101 of digital camera 100, power switch 184, release button 181, zoom dial 182, cross button 185, center button 183, and so on are provided. These correspond to operation unit 180 shown in FIG. 1.

Power switch 184 switches a power supply state of digital camera 100 between an ON state and an OFF state. When power switch 184 is turned into the ON state, components of digital camera 100 are supplied with power.

Release button 181 is a two-stage push-down button. Hereinafter, first-stage push-down of release button 181 is referred to as a "half-push". Second-stage push-down of release button 181 is referred to as a "full-push". When a user half pushes release button 181, controller 150 executes AF control to focus on an object. Upon focusing on an object, controller 150 controls such that a position of focus lens 111 is fixed. Controller 150 may continuously control movement of focus lens 111 so as to keep a state of focusing on an object against a shake in an optical axis direction as described below. When a user full pushes release button 181, controller 150 stores image data captured according to timing of the full-push in memory card 192 or the like.

Zoom dial 182 allows for an adjustment of a magnification and reduction factor to image an object at a wide angle or with a telephoto. Controller 150 generates a control signal to move zoom lens 112 in response to an operation of zoom dial 182 by a user.

Cross button 185 includes a top button, a right button, a bottom button, and a left button. When cross button 185 is pushed down, a selected item of a cursor display displayed on LCD 170 may be moved in a direction associated with a pushed-down button. Center button 183 is a push-down button for determining a selected item of a cursor display displayed on LCD 170.

CCD image sensor 120, AFE 121, and image processor 130 are an example of an imaging unit. Controller 150 is an example of an evaluation value detector and a controller. Acceleration sensor 190 is an example of a movement detector. Digital camera 100 is an example of an imaging apparatus.

1-2. Operation

Various operations of digital camera 100 according to the first exemplary embodiment will be described with reference to FIGS. 3 to 7. First, a conventional AF operation will be described in description of operations of digital camera 100.

[1-2-1. Conventional AF Operation]

Digital cameras generally perform an AF operation such as single AF. An AF operation is an operation to move a focus lens in an optical axis direction to form an image of an object through lenses in a focus state on a CCD image sensor.

Figure 3:
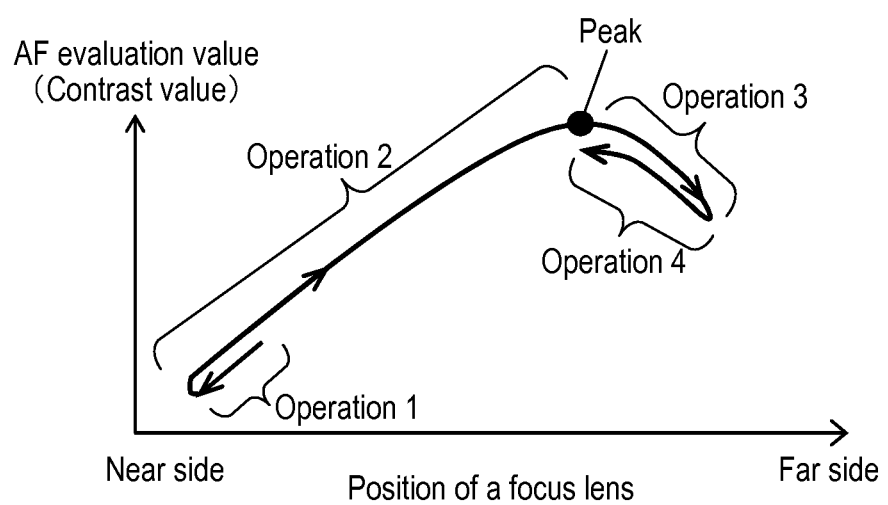
FIG. 3 is an explanatory graph of an operation of conventional single AF.

FIG. 3 is an explanatory graph of an operation of conventional single AF. In FIG. 3, a vertical axis represents a contrast value calculated based on image information obtained from a CCD image sensor. Hereinafter, the contrast value is also referred to as an AF evaluation value. A contrast value and an AF evaluation value are an example of a focus evaluation value. An AF evaluation value is obtained as a contrast value by integrating a high-frequency component of a luminance signal that constitutes image data. In FIG. 3, a horizontal axis represents position of a focus lens. A digital camera can move a focus lens position from a near side to a far side, thereby changing a level of the AF evaluation value. At this time, as shown in FIG. 3, a position of the focus lens at which the contrast value indicates a peak (focus value) is a position that causes an object image through an optical system to be formed in a focus state on the CCD image sensor.

A conventional digital camera needs to temporarily move a focus lens as shown by "Operation 1" in FIG. 3 to monitor a change in the contrast value when searching for a focus lens position at which the contrast value becomes a peak. In "Operation 1", the digital camera moves the focus lens in a predetermined direction (to the near side in FIG. 3). Due to this predetermined initial moving direction, the focus lens moves to the near side although the peak of the contrast value is originally present on the far side in FIG. 3. Thus, the digital camera performing the movement shown in FIG. 3 performs a useless operation for the movement of the focus lens in the AF control.

When performing "Operation 1", the digital camera monitors the contrast value of an image. Upon finding a decrease in the contrast value after "Operation 1", as shown by "Operation 2", the movement of the focus lens is reversed to move the focus lens to the far side on which the peak of the contrast value is present.

Next, as shown by "Operation 3", the digital camera continues moving the focus lens to the far side to monitor that the contrast value has exceeded the peak. Specifically, the digital camera monitors that the contrast value has turned from a rise to a fall, and detects that the contrast value has exceeded the peak. Upon detecting that the contrast value has exceeded the peak, the digital camera reverses the movement of the focus lens as shown by "Operation 4", and moves the focus lens to a position of the focus lens, at which the contrast value becomes the peak, detected in "Operation 3". With this, the digital camera can form an object image through lenses in a focus state on the CCD image sensor.

FIG. 4 is a flowchart of the operation of the conventional single AF. The operation of the single AF described above with reference to FIG. 3 will be described with reference to the flowchart in FIG. 4.

First, when receiving a half-push operation of a release button, the digital camera starts the single AF operation (step S0), and moves the focus lens in a predetermined direction (to the near side in FIGS. 3 and 4) (step S1). The operation so far corresponds to "Operation 1" described in FIG. 3.

Next, the digital camera detects a contrast value (step S2), and determines whether the contrast value has risen (step S3). Then, if the digital camera determines that the contrast value has fallen (No in step S3), the operation proceeds to step S41, in which the focus lens is moved to the far side. That is, the digital camera reverses the moving direction of the focus lens in this case. The operation so far corresponds to "Operation 2" described in FIG. 3.

Further, returning to step S2, the digital camera detects a contrast value, and in step S3, determines whether the contrast value has risen. Then, if the digital camera determines that the contrast value has risen (Yes in step S3), the operation proceeds to step S40, in which the focus lens is continuously moved to the far side. Further, in step S5, the digital camera detects a contrast value and determines whether the contrast value has risen (step S6). If the digital camera determines that the contrast value has risen (Yes in step S6), the digital camera repeats the operation in steps S40, S5, and S6. The operation so far corresponds to "Operation 3" described in FIG. 3.

On the other hand, if the digital camera determines that the contrast value has fallen in step S6 (No in step S6), the digital camera proceeds to step S7, calculates a focus position, moves the focus lens to the focus position (step S8), and finishes the single AF operation (step S9). The operation so far corresponds to "Operation 4" described in FIG. 3.

However, in the single AF operation in the conventional digital camera, a useless operation of reversing the movement of the focus lens from "Operation 1" to "Operation 2" may be performed as described here. Therefore, conventional digital cameras have a problem that it takes time to form an object image through lenses in a focus state on a CCD image sensor.

[1-2-2. Optical Axis Direction Shake Correction]

Digital camera 100 according to the first exemplary embodiment performs an AF operation in a short amount of time, using information on movement in an optical axis direction. Such control is hereinafter referred to as optical axis direction shake correction.

The AF operation is executed based on a contrast value calculated every time image data is generated. Based on the contrast value, controller 150 determines a direction to which focus lens 111 is to be moved and a focus state of an object image. A single AF operation is similar to the conventional AF operation described in the above section and thus will not be described here.

First, an outline of optical axis direction shake correction will be described. FIGS. 5A to 5D are explanatory diagrams of operations of optical axis direction shake correction. Optical axis direction shake correction refers to focus control using information on a movement of digital camera 100 in an optical axis direction obtained from acceleration sensor 190 and information on a change in the contrast value. Digital camera 100 according to the first exemplary embodiment uses a lens group having positive power as focus lens 111. Therefore, by retracting focus lens 111, a focal point on an object side moves in a direction away from digital camera 100. On the other hand, by digital camera 100 extending focus lens 111, a focal point on an object side moves in a direction toward digital camera 100. Patterns A to D shown in FIGS. 5A to 5D each show (1) a moving direction of digital camera 100 with respect to an object, (2) a change in a contrast value, and (3) a moving direction of focus lens 111 for focus.

Figure 5A:
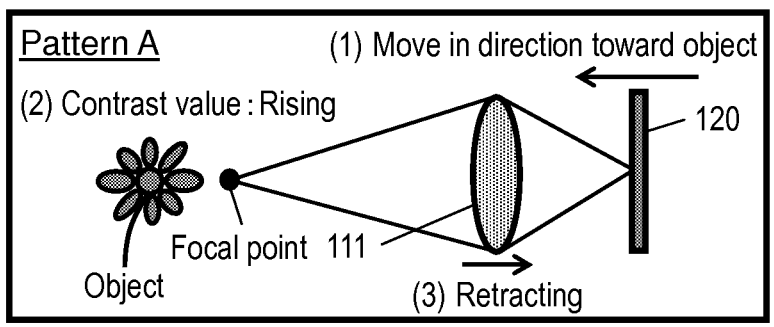
FIGS. 5A to 5D are explanatory diagrams of an operation of optical axis direction shake correction according to the first exemplary embodiment.

Pattern A in FIG. 5A shows a case where (1) digital camera 100 has moved in a direction toward an object, and (2) a contrast value has risen (a case where a focal point has moved toward the object). In this case, as shown in Pattern A in FIG. 5A, the focal point is present between the object and digital camera 100, and thus a position of focus lens 111 needs to be moved to a far side in order to focus an object image through lenses on CCD image sensor 120. Therefore, in Pattern A, by (3) moving focus lens 111 in a retracting direction, digital camera 100 can properly move focus lens 111 in a direction to focus on the object image.

Figure 5B:
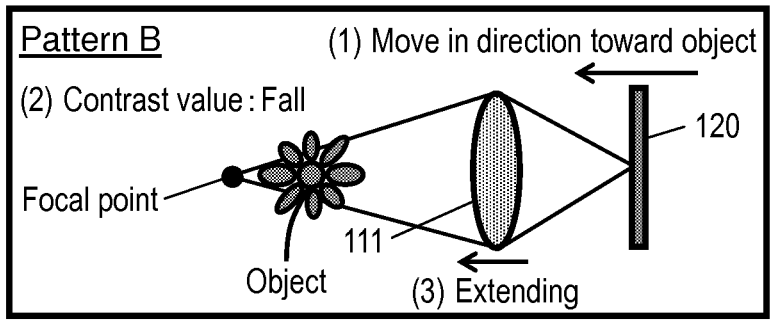

Pattern B in FIG. 5B shows a case where (1) digital camera 100 has moved in a direction toward an object, and (2) a contrast value has fallen (a case where a focal point has moved away from the object). In this case, as shown in Pattern B in FIG. 5B, the object is present between the focal point and digital camera 100, and thus a position of focus lens 111 needs to be moved to a near side in order to focus an object image through lenses on CCD image sensor 120. Therefore, in Pattern B, by (3) moving focus lens 111 in an extending direction, digital camera 100 can properly move focus lens 111 in a direction to focus on the object image.

Figure 5C:
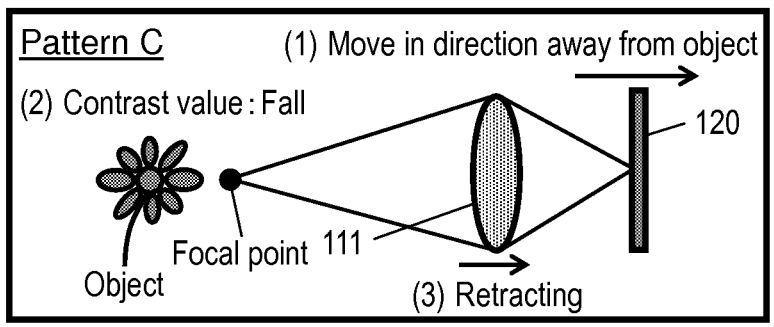

Pattern C in FIG. 5C shows a case where (1) digital camera 100 has moved in a direction away from an object, and (2) a contrast value has fallen (a case where a focal point has moved away from the object). In this case, as shown in Pattern C in FIG. 5C, the focal point is present between the object and digital camera 100, and thus a position of focus lens 111 needs to be moved to the far side in order to focus an object image through lenses on CCD image sensor 120. Therefore, in Pattern C, by (3) moving focus lens 111 in a retracting direction, digital camera 100 can properly move focus lens 111 in a direction to focus on the object image.

Figure 5D:
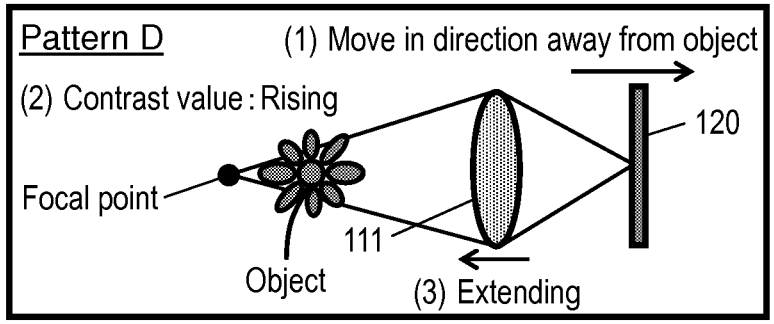

Pattern D in FIG. 5D shows a case where (1) digital camera 100 has moved in a direction away from an object, and (2) a contrast value has risen (a case where a focal point has moved toward the object). In this case, as shown in Pattern D in FIG. 5D, the object is present between the focal point and digital camera 100, and thus a position of focus lens 111 needs to be moved to the near side in order to focus an object image through lenses on CCD image sensor 120. Therefore, in Pattern D, by (3) moving focus lens 111 in an extending direction, digital camera 100 can properly move focus lens 111 in a direction to focus on the object image.

In Patterns A to D described above, digital camera 100 can detect a positional relationship between an object and a focal point, and a moving direction of digital camera 100, based on a contrast value and acceleration information. Thus, digital camera 100 can determine an initial moving direction (direction to which focus lens 111 is to be moved) of focus lens 111 in an AF operation. That is, it can be prevented that an initial moving direction of focus lens 111 become a direction to cause a focal point to move away from an object as in the conventional AF operation ("Operation 1" shown in FIG. 3), and an object image can be focused in a short amount of time.

Next, an operation of optical axis direction shake correction will be described. FIG. 6 is a flowchart of an operation of optical axis direction shake correction. First, upon receiving a half-push operation of release button 181, digital camera 100 starts the operation of optical axis direction shake correction (step S10). Then, digital camera 100 detects a contrast value based on image information output from CCD image sensor 120, and detects acceleration of digital camera 100 based on acceleration information output from acceleration sensor 190 (step S11).

In next step S12, based on the information obtained from acceleration sensor 190, it is determined whether digital camera 100 has moved in a direction toward or in a direction away from an object. If it is determined that digital camera 100 has moved in a direction toward the object (Yes in step S12), the operation proceeds to step S130. If it is determined that digital camera 100 has moved in a direction away from the object (No in step S12), the operation proceeds to step S131. Even when digital camera 100 has not moved focus lens 111, a movement of body 101 of digital camera 100 in an optical axis direction changes a distance from an object, thus changing a contrast value that indicates a focus state of the object. Then, in step S130 and step S131, it is determined whether the contrast value has risen or fallen.

If the contrast value has risen in step S130 (Yes in step S130), the operation proceeds to step S140, in which retraction of focus lens 111 (Pattern A) is performed. If the contrast value has fallen in step S130 (No in step S130), the operation proceeds to step S141, in which extension of focus lens 111 (Pattern B) is performed. If the contrast value has risen in step S131 (Yes in step S131), the operation proceeds to step S142, in which extension of focus lens 111 (Pattern D) is performed. If the contrast value has fallen in step S131 (No in step S131), the operation proceeds to step S143, in which retraction of focus lens 111 (Pattern C) is performed.

Thus, digital camera 100 classifies optical axis direction shake correction into the cases of Pattern A, B, C, and D in FIGS. 5A to 5D, and focus lens 111 is moved in a direction according to respective step S140, S141, S143, or S142. In step S15, digital camera 100 continues moving focus lens 111. Then, in step S16, digital camera 100 detects a contrast value based on image information output from CCD image sensor 120, and in step S17, determines whether the contrast value has risen or fallen. Steps S15, S16, and S17 are processing for detecting a position of focus lens 111 at which the contrast value becomes a peak. If the contrast value has risen in step S17 (Yes in step S17), the operation returns to step S15, in which digital camera 100 continues moving focus lens 111.

If it is determined that the contrast value has fallen in step S17 (No in step S17), digital camera 100 determines that the contrast value has exceeded the peak. In step S18, digital camera 100 determines, by calculation, a position of focus lens 111 at which the contrast value becomes the peak as a focus position. In step S19, digital camera 100 moves focus lens 111 to the focus position. In step S20, acceleration is detected from information on acceleration in an optical axis direction output from acceleration sensor 190, and in step S21, an amount (amount of movement) focus lens 111 is to be moved is determined by calculation based on the detected acceleration. In step S22, focus lens 111 is moved based on the amount of movement of focus lens 111 determined in step S21.

The amount of movement of focus lens 111 can be determined from the amount of movement of digital camera 100 in an optical axis direction obtained by twice integrating acceleration. Alternatively, the amount of movement of focus lens 111 may be calculated based on velocity information on digital camera 100 that is determined by once integrating acceleration. Although focus lens 111 is temporarility moved to the focus position in above step S19, it is alternatively possible to move focus lens 111 to a focus position finally in step S22 without moving focus lens 111 in step S19.

In step S23, digital camera 100 determines whether release button 181 has been full-pushed. If release button 181 has not been full-pushed (No in step S23), the operation proceeds to step S241. In step S241, it is determined whether a half-push of release button 181 has been released. If it is determined that the half-push of release button 181 has not been released (No in step S241), the operation returns to processing in preceding step S20. That is, when a half-pushed state of release button 181 is continued, processing of detecting acceleration in step S20, calculating the amount (amount of movement) focus lens 111 is to be moved in step S21, and moving focus lens 111 in step S22 is repeatedly performed.

If it is determined that the half-push of release button 181 has been released in step S241 (Yes in step S241), digital camera 100 terminates the operation of optical axis direction shake correction (step S25). If it is determined that release button 181 has been full-pushed in step S23 (Yes in step S23), digital camera 100 performs imaging processing such as storing image data acquired from CCD image sensor 120 in memory card 192 or the like in step S240, and completes the operation of optical axis direction shake correction (step S25).

Figure 7:
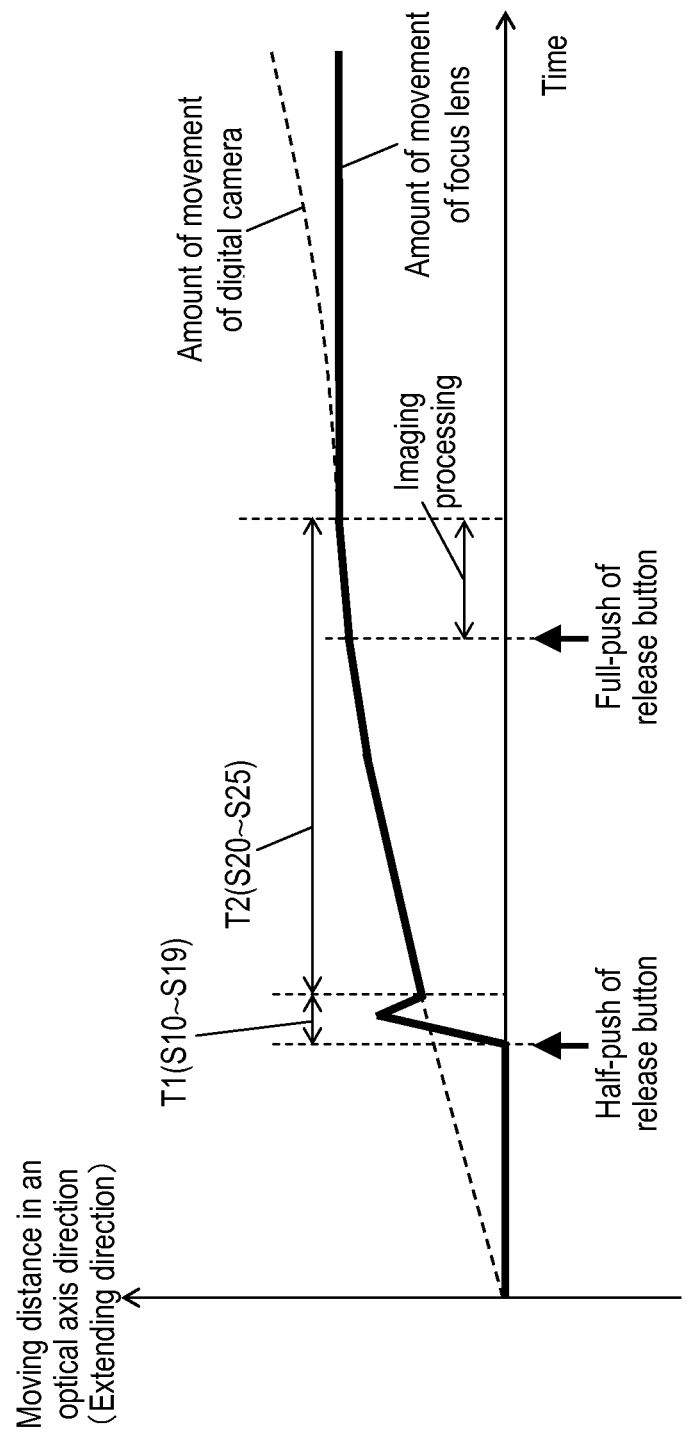
FIG. 7 is a graph of an operating principle of optical axis direction shake correction according to the first exemplary embodiment.

FIG. 7 is a graph of an operating principle of optical axis direction shake correction according to the first exemplary embodiment. In FIG. 7, a horizontal axis represents time, a vertical axis represents a moving distance (amount of movement) in an optical axis direction, and an upward direction is an extending direction. A solid line in FIG. 7 indicates the amount of movement in the optical axis direction of focus lens 111, and a broken line indicates the amount of movement in the optical axis direction of digital camera 100. It is assumed here that a movement in an optical axis direction of an image-forming position of an object image with respect to a movement (an amount of movement X) in an optical axis direction of digital camera 100 itself can be canceled by moving focus lens 111 by the same amount of movement X. That is, even when an amount of movement X in an optical axis direction of digital camera 100 is produced from a state where an object image is formed (focus state), by moving focus lens 111 by the amount of movement X in an optical axis direction, the focus state can be maintained. Therefore, when a locus of motion in an optical axis direction of digital camera 100 agrees with a locus of motion of focus lens 111 in FIG. 7, the focus state is considered to be maintained.

When release button 181 receives a half-push operation, digital camera 100 starts optical axis direction shake correction. An operation performed in time T1 shown in FIG. 7 corresponds to processing details of steps S10 to S19 described with reference to FIG. 6. Specifically, it is an operation described below. Digital camera 100 determines whether a moving direction of digital camera 100 is a direction toward or a direction away from an object, using a contrast value and information on movement of digital camera 100. Based on a result of the determination, digital camera 100 moves focus lens 111 in a direction to form an object image through lenses on CCD image sensor 120 (in a focusing direction). Next, while moving focus lens 111 in the same direction (in the focusing direction), digital camera 100 continuously detects a contrast value. When digital camera 100 determines that the contrast value has fallen from a rising state, digital camera 100 determines that the contrast value has exceeded a peak. When digital camera 100 determines that the contrast value has exceeded the peak, digital camera 100 calculates a position of focus lens 111 at which the contrast value becomes the peak as a focus position, and moves focus lens 111 to the focus position.

Next, an operation performed in time T2 shown in FIG. 7 corresponds to processing details of steps S20 to S25 described with reference to FIG. 6. Specifically, it is an operation described below. Digital camera 100 calculates the amount (amount of movement) focus lens 111 is to be moved based on information on acceleration in an optical axis direction to move focus lens 111. The amount of movement of focus lens 111 can be determined from the amount of movement of digital camera 100 in the optical axis direction obtained by twice integrating the acceleration. When a half-pushed state of release button 181 is continued, the amount of movement of focus lens 111 is determined by calculation based on acceleration information output from acceleration sensor 190, and processing of moving focus lens 111 is continuously performed. When release button 181 is full-pushed, imaging processing such as storing image data acquired from CCD image sensor 120 in memory card 192 or the like is performed to complete the operation of the optical axis direction shake correction. When it is determined that the half-push of release button 181 has been released, the operation of the optical axis direction shake correction is terminated without performing the imaging processing.

1-3. Summary

Digital camera 100 according to the first exemplary embodiment can operate AF to come into a focus state in a short amount of time even when a user causes a displacement of a camera in an optical axis direction with respect to a desired object.

Second Exemplary Embodiment

In a second exemplary embodiment, description will be made of a case where optical axis direction shake correction in the present disclosure is applied to a digital camera with an interchangeable lens.

2-1. Configuration

Figure 8:
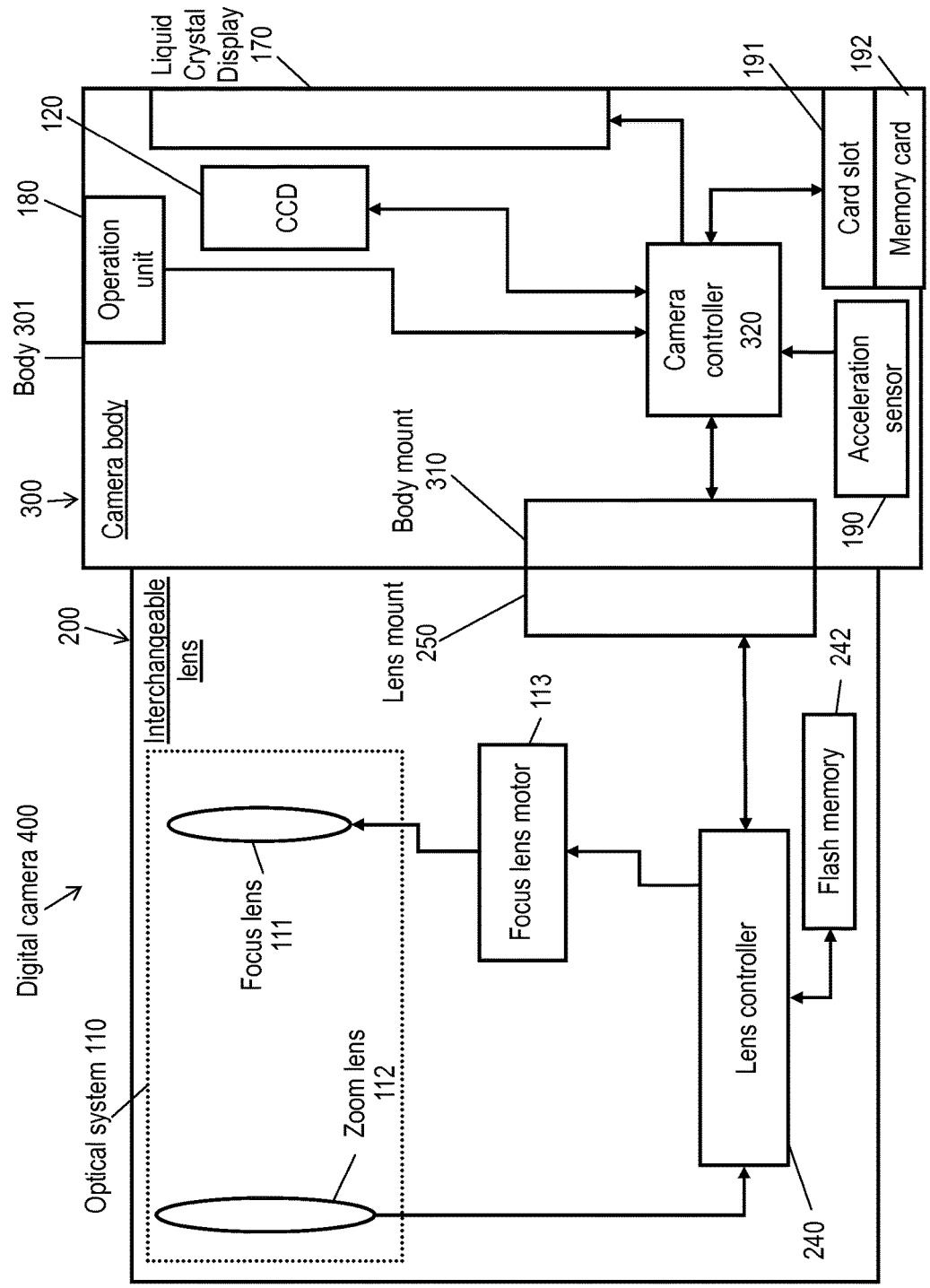
FIG. 8 is an electrical configuration diagram of a digital camera according to a second exemplary embodiment.

FIG. 8 shows a schematic configuration diagram of digital camera 400 according to the second exemplary embodiment. In the second exemplary embodiment, digital camera 400 with an interchangeable lens will be described, and components serving functions similar to those in the first exemplary embodiment are denoted by the same reference numerals as in the first exemplary embodiment and will not be described.

Camera body 300 of digital camera 400 has body 301 to which interchangeable lens 200 is detachably attached. Camera body 300 has body mount 310 and camera controller 320. Interchangeable lens 200 has lens controller 240, flash memory 242, and lens mount 250. Here, zoom lens 112 shown in FIG. 8 has a configuration to be driven manually, but may alternatively be driven by zoom lens motor 114 as in the first exemplary embodiment.

Body mount 310 can be mechanically and electrically connected to lens mount 250 of interchangeable lens 200. Body mount 310 can transmit and receive a command and data to and from interchangeable lens 200 via lens mount 250. Body mount 310 transmits various control signals received from camera controller 320 to lens controller 240 via lens mount 250. Body mount 310 supplies power supplied from a power source to entire interchangeable lens 200 via lens mount 250.

Camera controller 320 controls an operation of each unit such as CCD image sensor 120, according to an direction from an operating member such as release button 181, thereby controlling an operation of an entire camera system including camera body 300 and interchangeable lens 200. Camera controller 320 can issue a control direction to interchangeable lens 200 through body mount 310. Here, camera controller 320 is configured with functions of AFE 121, image processor 130, and buffer memory 140 shown in FIG. 1 in the first exemplary embodiment. Alternatively, camera body 300 may have AFE 121, image processor 130, and buffer memory 140 separately from camera controller 320. Camera controller 320 is an example of an evaluation value detector and a controller.

Lens controller 240 controls an operation of entire interchangeable lens 200, based on a control signal from camera controller 320. Lens controller 240 also receives a signal from a position detection sensor (not shown) for detecting a position of a lens or the like, and transmits the signal to camera controller 320. For transmission and reception to and from camera controller 320, lens controller 240 performs transmission and reception via lens mount 250 and body mount 310.

Lens mount 250 is mechanically and electrically connectable to body mount 310 of camera body 300. Lens mount 250 can transmit and receive a command and data to and from camera body 300 via body mount 310. Lens mount 250 transmits various control signals received from lens controller 240 to camera controller 320 via body mount 310. Hereinafter, communication between camera body 300 and interchangeable lens 200 performed via body mount 310 and lens mount 250 is referred to as BL communication (Body-Lens communication).

2-2. Operation

Next, digital camera 400 in the second exemplary embodiment can perform an operation of optical axis direction shake correction like digital camera 100 in the first exemplary embodiment.

Specifically, in digital camera 400, the operation from step S10 to steps S130 and S131 shown in FIG. 6 is performed by camera body 300. That is, camera controller 320 determines a moving direction of body 301 in an optical axis direction, based on information detected by acceleration sensor 190 (step S12), and determines a change in the contrast value indicating a focus state that occurs with the movement (steps S130 and S131). Then, camera body 300 determines a direction and an amount in and by which focus lens 111 is moved. A method of determining a direction and an amount in and by which focus lens 111 is moved is similar to that in the first exemplary embodiment and thus will not be described.

Lens controller 240 controls focus lens motor 113 based on information on the moving direction and the amount of movement of focus lens 111 obtained by BL communication to move focus lens 111 (steps S140 to S143 in FIG. 6). Lens controller 240 transmits information on an actual amount of movement and moving direction of focus lens 111 to camera controller 320 using BL communication.

Camera controller 320 monitors an amount of movement of focus lens 111 obtained from lens controller 240. On the other hand, camera controller 320 also monitors a contrast value of an image obtained from CCD image sensor 120, and detects whether the contrast value has exceeded a peak or not. If camera controller 320 detects that the contrast value has exceeded the peak (No in S17 in FIG. 6), camera controller 320 calculates a position of focus lens 111 in a focus state, and notifies lens controller 240 of the position by BL communication.

Upon receiving position information on focus lens 111 corresponding to the focus position from camera controller 320, lens controller 240 reverses the moving direction of focus lens 111 and moves focus lens 111 to the focus position (step S19). Other operations are similar to those in the first exemplary embodiment except that BL communication is used and thus will not be described.

2-3. Summary

Digital camera 400 according to the second exemplary embodiment includes interchangeable lens 200 and camera body 300, and can perform optical axis direction shake correction using BL communication. Digital camera 400 according to the second exemplary embodiment can operate AF to come into a focus state in a short amount of time even when a user causes a displacement of the camera in an optical axis direction with respect to a desired object.

The above has described an example in which acceleration sensor 190 is mounted in camera body 300 as shown in FIG. 8, acceleration sensor 190 may alternatively be mounted in interchangeable lens 200. In this case, acceleration information output from acceleration sensor 190 is transferred to camera controller 320 of camera body 300 using BL communication, and optical axis direction shake correction described in the second exemplary embodiment is performed.

Other Exemplary Embodiments

In the first and second exemplary embodiments, a user operates cross button 185 and center button 183 to shift to an operation mode of optical axis direction shake correction, and the user half pushes release button 181 to operate optical axis direction shake correction. Alternatively, optical axis direction shake correction may operate (continuously operate) before the user half pushes release button 181. Further, a controller may detect that a macro lens is being used and close-up shooting is being performed, to cause a camera to automatically shift to an operation mode of optical axis direction shake correction. Moreover, when a controller detects a change in the contrast value caused by a user panning a digital camera, by a change in a state of an object, or the like, the controller may cause the digital camera to automatically shift to an operation mode of optical axis direction shake correction.

In the first and second exemplary embodiments, focus lens 111 is illustrated with an image of a convex lens. Alternatively, a focus lens may be depicted with an image of a concave lens in combination with another convex lens. In this case, a moving direction of the concave lens focus lens is opposite to a moving direction of convex lens focus lens 111 described in the first and second exemplary embodiments.

In the first and second exemplary embodiments, optical axis direction shake correction is performed once between a half-push and a full-push of release button 181 by a user, but the present disclosure is not limited to this. Optical axis direction shake correction may be performed at predetermine time intervals until release button 181 is full-pushed after optical axis direction shake correction has been performed. Alternatively, after optical axis direction shake correction has been performed, optical axis direction shake correction may be performed again when a digital camera or a focus lens is moved by a predetermined amount or more until release button 181 is full-pushed.

In the first and second exemplary embodiments, a focus evaluation value is calculated based on a contrast value, but the present disclosure is not limited to this. A focus evaluation value may be calculated based on object distance information using DFD (Depth From Defocus) or the like. In the first and second exemplary embodiments, focus evaluation is based on a rise or a fall in the focus evaluation value since a contrast value is used as a focus evaluation value. Alternatively, when object distance information is used, focus evaluation may be performed based on whether a focus evaluation value as the object distance information is near a predetermined value (predetermined distance) or not.

In the first and second exemplary embodiments, the digital camera performs auto focus using optical axis direction shake correction, but the present disclosure is not limited to this. When a user is shooting in manual auto focus, a driving direction of a focus lens may be determined based on a movement of a digital camera in an optical axis direction and a focus evaluation value of an image, and the driving direction of the focus lens may be displayed on a liquid crystal display or the like. With this, a user can see a proper driving direction of the focus lens even in manual focus shooting.

The present disclosure can be applied to an imaging apparatus equipped with an auto focus system such as a digital camera, a movie camera, or a camera-equipped cellular phone.

What is claimed is:

1. An imaging apparatus comprising:
   a body;
   an imaging unit provided in the body, the imaging unit for capturing an image of an object and generating an image;
   a focus lens movable in an optical axis direction, the focus lens for adjusting a focus state of the image;
   an evaluation value detector for detecting a focus evaluation value of the image;
   a movement detector for detecting a moving direction and an amount of movement of the body in the optical axis direction; and
   a controller for controlling movement of the focus lens,
   wherein the evaluation value detector detects a first focus evaluation value of the image before the movement of the body in the optical axis direction and a second focus evaluation value of the image, and
   wherein the controller determines a direction to which the focus lens is to be moved based on (i) the moving direction of the body in the optical axis direction detected by the movement detector and (ii) the first focus evaluation value and the second focus evaluation value.

2. The imaging apparatus according to claim 1, wherein the direction the focus lens is to be moved is a direction to bring a focal point on an object side closer to the object.

3. The imaging apparatus according to claim 1, wherein the controller calculates an amount the focus lens is to be moved, based on the amount of movement of the body in the optical axis direction detected by the movement detector.

4. A camera body configured to detachably hold an interchangeable lens including a focus lens, the camera body comprising:
   a body;
   an imaging unit provided in the body, the imaging unit for capturing an image of an object and generating an image;
   an evaluation value detector for detecting a focus evaluation value of the image;
   a movement detector for detecting a moving direction and an amount of movement of the body in an optical axis direction; and
   a controller for directing the interchangeable lens to move the focus lens,
   wherein the evaluation value detector detects a first focus evaluation value of the image before the movement of the body in the optical axis direction and a second focus evaluation value of the image, and
   wherein the controller directs the interchangeable lens a direction to move the focus lens based on (i) the moving direction of the body in the optical axis direction detected by the movement detector and (ii) the first focus evaluation value and the second focus evaluation value.

5. The camera body according to claim 4, wherein the direction to move the focus lens is a direction to bring a focal point on an object side closer to the object.

* * * * *